(12) United States Patent
Asanuma et al.

(10) Patent No.: US 8,199,347 B2
(45) Date of Patent: Jun. 12, 2012

(54) DETERMINING IF A BROADCAST PRINT REQUEST ENDS BEFORE A PRINT JOB IS COMPLETED, AND TAKING ACTION IN ACCORDANCE WITH THE DETERMINATION

(75) Inventors: Tomoya Asanuma, Yokohama (JP); Osamu Yonishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 897 days.

(21) Appl. No.: 12/198,166

(22) Filed: Aug. 26, 2008

(65) Prior Publication Data
US 2009/0059282 A1 Mar. 5, 2009

(30) Foreign Application Priority Data

Aug. 28, 2007 (JP) ................................. 2007-221307

(51) Int. Cl.
*G06F 3/12* (2006.01)
(52) U.S. Cl. ...................................................... 358/1.15
(58) Field of Classification Search .................. 358/1.15
See application file for complete search history.

(56) References Cited

U.S. PATENT DOCUMENTS

2004/0263895 A1 12/2004 Tomita et al.
2005/0275875 A1 12/2005 Jennings, Jr.

FOREIGN PATENT DOCUMENTS

JP 2004-229223 8/2004
JP 2006-293779 A 10/2006

*Primary Examiner* — Benny Q Tieu
*Assistant Examiner* — Eric A Rust
(74) *Attorney, Agent, or Firm* — Cowan, Liebowitz & Latman, P.C.

(57) ABSTRACT

A digital broadcast receiving apparatus for receiving a digital broadcast signal including print information, the apparatus being configured to communicate with a printing apparatus and to receive a print request, is provided. The apparatus comprises: a first obtaining unit configured to obtain first information regarding a period of duration of a print process that is being executed by the printing apparatus; a second obtaining unit configured to obtain second information regarding an existing period during which print information that corresponds to the print request is included in the digital broadcast signal that is being received; a determination unit operable to determine whether or not the existing period ends earlier than the period of duration based on the first information and the second information; and a controller configured to control issuance of an instruction to suspend the print process that is being executed based on a determination result by the determination unit.

7 Claims, 9 Drawing Sheets

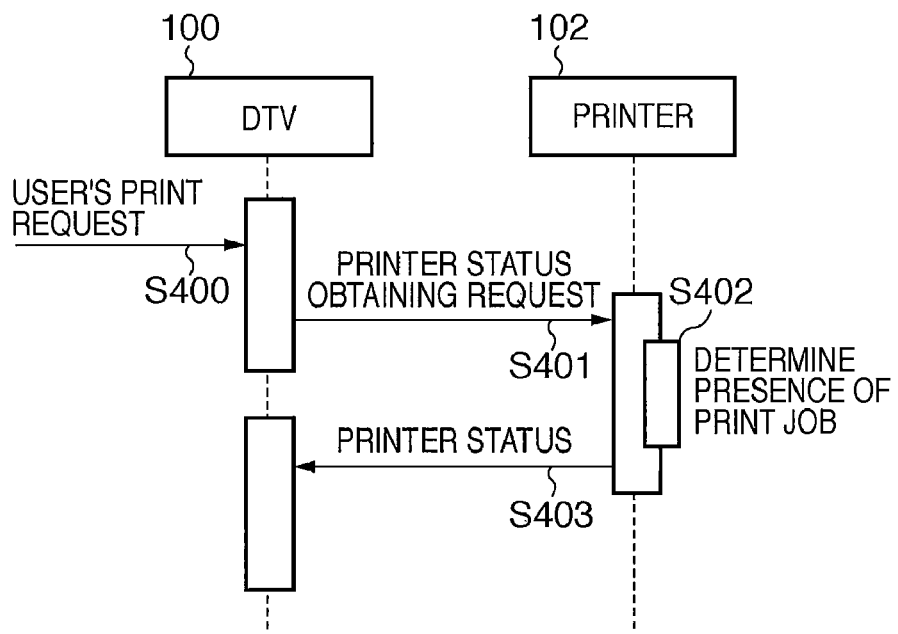
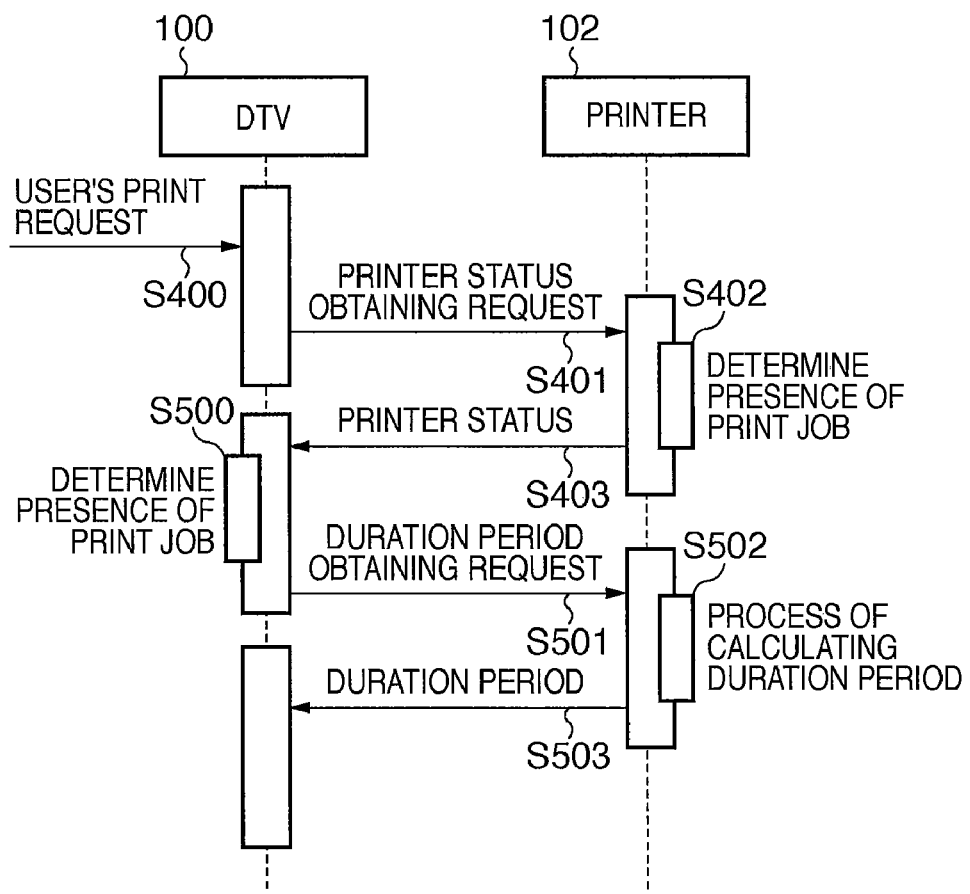

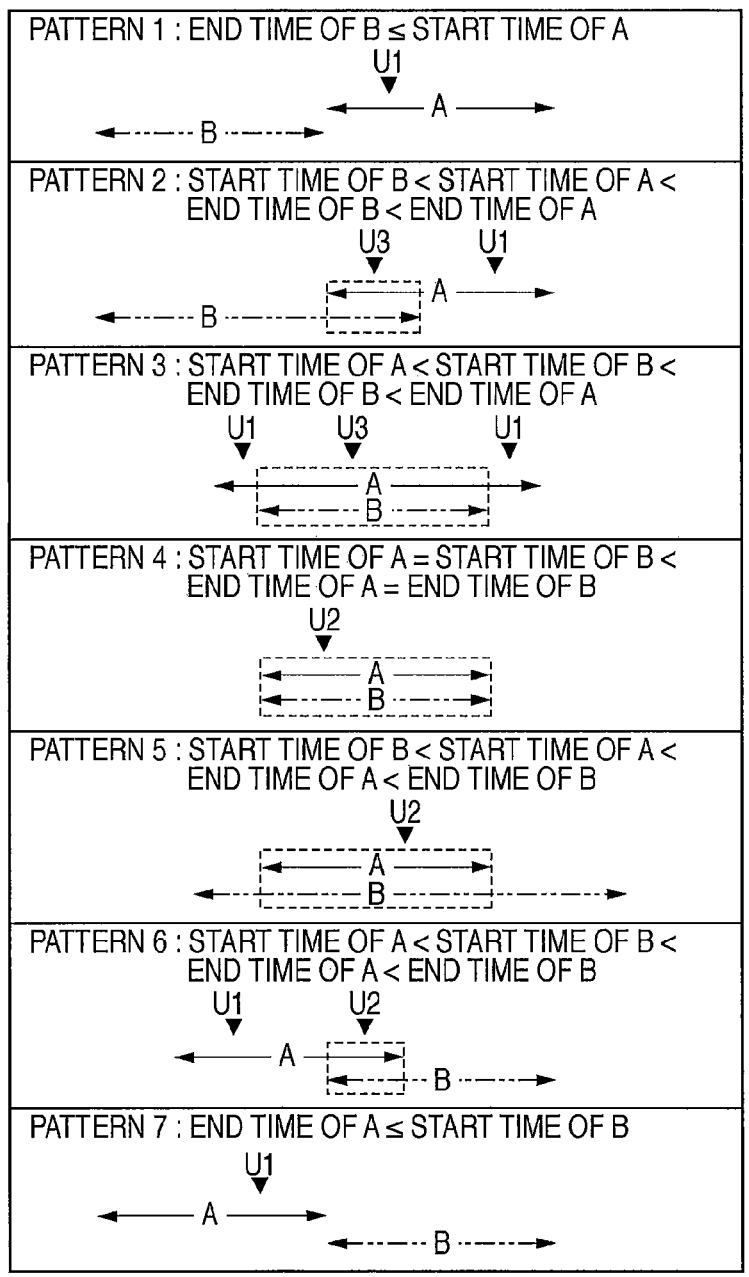

DETERMINING IF A BROADCAST PRINT REQUEST ENDS BEFORE A PRINT JOB IS COMPLETED, AND TAKING ACTION IN ACCORDANCE WITH THE DETERMINATION

BACKGROUND OF THE INVENTION

1. Field of the Invention

The present invention relates to a digital broadcast receiving apparatus capable of receiving digital broadcast signals including print information, and a method for controlling the same.

2. Description of the Related Art

A service of printing datacasts is known as one of the datacasting services of digital terrestrial broadcasting, and digital televisions (DTVs) and printers that can carry out this printing service are known. With this printing service, the user can cause a printer to print "print content" based on print information included in a broadcast transmission (broadcast signal). Digital broadcasting standards and operation guidelines regarding printing services are described in the standards ARIB STD-B24, version 4.4, "Data Coding and Transmission Specifications for Digital Broadcasting" by the Association of Radio Industries and Businesses, Japan, and in the technical report ARIB TR-B14, version 2.7, "Operational Guidelines for Digital Terrestrial Television Broadcasting" by the Association of Radio Industries and Businesses, Japan. ARIB STD-B24 and ARIB TR-B14 are available at the website of the Digital Broadcasting Experts Group (http://www.dibeg.org/aribstd/ARIBSTD.htm). Note that the versions of ARIB STD-B24 and ARIB TR-B14 available at the website are 5.1 and 2.8 respectively, due to the revisions of the specifications. In other words, the versions noted in the present application are different from those available at the website. However, there are no substantial changes between these versions with respect to the "printing service".

In the printing service, ordinarily, the period during which particular print information is included in a broadcast transmission is limited. Accordingly, when the user desires to cause a printer to print particular print content, the necessary print information may not be included in the broadcast transmission, and the user may fail to obtain desired print content.

In view of the above, a print system has been proposed that realizes a method in which a DTV issues a print request to a printer at an appropriate timing designated by a broadcast station (see Japanese Patent Laid-open No. 2004-229223).

Many of the currently available printers often cannot accept a plurality of print requests due to cost considerations, amongst other factors. This is because a printer needs to incorporate a storage area for storing print data in order to accept a plurality of print requests, and this leads to an increase in the cost of the printer. Accordingly, when a DTV issues a print request to a printer, if the printer is executing a print process based on another print request from a PC or the like, the printer cannot accept the print request from the DTV until the printer completes the print process being executed. When the printer completes the print process being executed, however, it is often the case that necessary print information is no longer included in the broadcast wave, and the problem arises that the user fails to acquire the desired print content.

In recent years, multifunction printers (MFPs) having many functions, such as printing, copying, scanning and faxing, have become widely used. Because an MFP typically receives print requests from many devices, it is more frequently in a situation in which it is executing a print process when receiving a print request than a single-function printer. Therefore, when an MFP is used to perform the service of printing digital broadcasts, the above-described problem becomes more prominent.

Regarding this problem, in the print system according to Japanese Patent Laid-Open No. 2004-229223, whether or not the printer is executing a print process based on another print request is not considered when the DTV issues a print request to the printer. Accordingly, the print system according to Japanese Patent Laid-Open No. 2004-229223 cannot solve the above problem.

SUMMARY OF THE INVENTION

The present invention has been conceived in view of the foregoing situation, and it is an aim of the present invention to provide a technique for reducing the possibility that the user of a digital broadcast receiving apparatus cannot print desired print information included in a broadcast signal.

The present invention in its first aspect provides a digital broadcast receiving apparatus for receiving a digital broadcast signal including print information, the apparatus being configured to communicate with a printing apparatus, the digital broadcast receiving apparatus comprises: a reception unit operable to receive a print request for execution of a print process based on print information included in a digital broadcast signal that is being received; a first obtaining unit configured to obtain first information regarding a period of duration of a print process that is being executed by the printing apparatus; a second obtaining unit configured to obtain second information regarding an existing period during which print information that corresponds to the print request is included in the digital broadcast signal that is being received; a determination unit operable to determine whether or not the existing period ends earlier than the period of duration, based on the first information and the second information; and a controller configured to control issuance of an instruction to suspend the print process that is being executed, based on a determination result by the determination unit.

The present invention in its second aspect provides a method for controlling a digital broadcast receiving apparatus that receives a digital broadcast signal including print information, and that is connected to a printing apparatus so as to communicate therewith, the method comprises: receiving a print request that requests execution of a print process based on print information included in a digital broadcast signal that is being received; obtaining first information regarding a period of duration of a print process that is being executed by the printing apparatus; obtaining second information regarding an existing period during which print information that corresponds to the print request is included in the digital broadcast signal that is being received; determining whether or not the existing period ends earlier than the period of duration based on the first information and the second information; and controlling issuance of an instruction to suspend the print process that is being executed based on a determination result of the determination step.

The present invention in its third aspect provides a machine readable storage medium storing a computer program which, when loaded into a digital broadcast receiving apparatus and executed, performs a method comprising: receiving a print request that requests execution of a print process based on print information included in a digital broadcast signal that is being received; obtaining first information regarding a period of duration of a print process that is being executed by printing apparatus in communication with the digital broadcast receiving apparatus; obtaining second information regarding an existing period during which print information that corresponds to the print request is included in the digital broadcast signal that is being received; determining whether or not the existing period ends earlier than the period of duration based on the first information and the second information; and controlling issuance of an instruction to suspend the print process that is being executed based on a determination result of the determination step.

Further features of the present invention will become apparent from the following description of exemplary embodiments with reference to the attached drawings.

BRIEF DESCRIPTION OF THE DRAWINGS

FIG. 4 is a sequence diagram illustrating the flow of a process performed by the DTV according to the first embodiment to obtain the status of a printer.

FIG. 5 is a sequence diagram illustrating the flow of a process performed by the DTV according to the first embodiment to obtain the period of duration of a print process being executed by the printer.

FIG. 6 is a diagram illustrating the relationship between the existing period of print information, the period of duration of a print process, and print request timing.

DESCRIPTION OF THE EMBODIMENTS

Preferred embodiments of the present invention will now be described with reference to the attached drawings. Each embodiment described below will be helpful in understanding a variety of concepts from the generic to the more specific.

It should be noted that the technical scope of the present invention is defined by the claims, and is not limited by the embodiments described below. In addition, not all combinations of the features described in the embodiments are necessarily required for realizing the present invention.

[First Embodiment]

Figure 1:
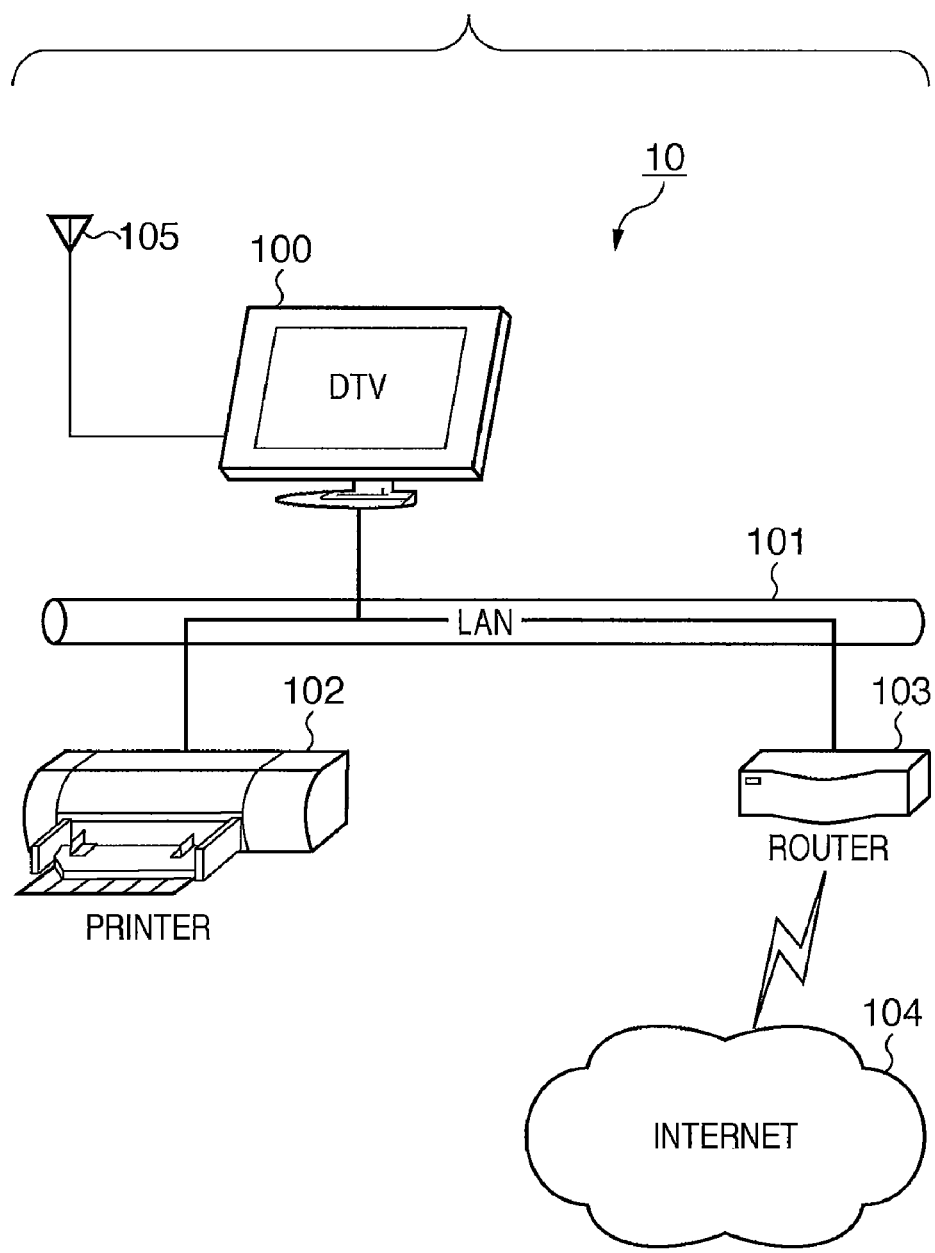
FIG. 1 is a diagram illustrating the configuration of a print system for utilizing a printing service of digital broadcasting.

FIG. 1 is a diagram illustrating the configuration of a print system 10 for utilizing a printing service of digital broadcasting.

The print system 10 includes a digital television (DTV) 100, which is an example of a digital broadcast receiving apparatus of the present invention, a printer 102, which is an example of a printing apparatus, and a router 103. The DTV 100 can receive broadcast waves (digital broadcast signals) from an antenna 105. The DTV 100, the printer 102 and the router 103 are connected via a local area network (LAN) 101 such that they can communicate with one another, and the router 103 is connected to the Internet 104. The LAN 101 is implemented by, for example, Ethernet®.

Figure 2:
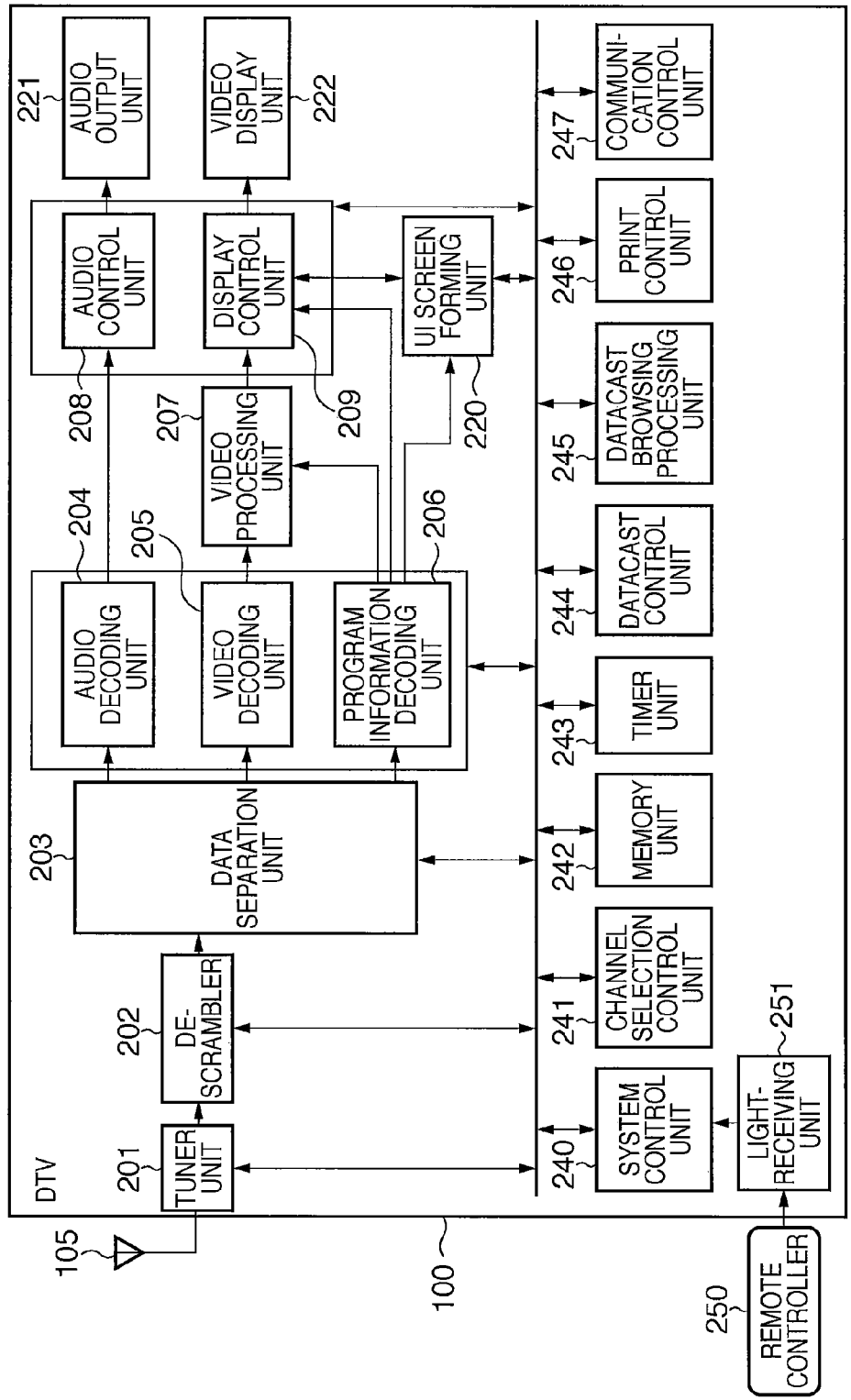
FIG. 2 is a block diagram illustrating the configuration of a digital television (DTV) according to a first embodiment.

FIG. 2 is a block diagram illustrating the configuration of the DTV 100. The DTV 100 roughly has a basic function as a television, a function for browsing datacasts, and a function for printing datacasts. These functions will be described below one by one.

Basic Television Function of DTV 100

As shown in FIG. 2, a digital broadcast signal received by the antenna 105 is input to a tuner unit 201. The tuner unit 201 performs processing, such as demodulation, error correction and the like, on the input digital broadcast signal, and generates transport stream data (hereinafter referred to as "TS"). The tuner unit 201 outputs the generated TS to a descrambler 202. In the TS, video data, audio data and program information and so on for a plurality of channels are time-division multiplexed.

A data separation unit 203 extracts, from the TS that has been input from the descrambler 202, the audio data, video data and program information of a channel that is selected with a remote controller 250 via a light-receiving unit 251, and then outputs the extracted data to an audio decoding unit 204, a video decoding unit 205 and a program information decoding unit 206.

The audio decoding unit 204 performs a demodulation process on the audio data that has been input from the data separation unit 203, and outputs the resulting signal to an audio control unit 208.

The video decoding unit 205 performs a demodulation process in accordance with MPEG or the like on the video data that has been input from the data separation unit 203, and outputs the demodulated video data to a video processing unit 207.

The program information decoding unit 206 obtains desired information from the program information that has been input from the data separation unit 203, and outputs the information to the video processing unit 207, a user interface (UI) screen forming unit 220, and a display control unit 209.

The program information mainly includes data, such as an SDT (Service Description Table), an EIT (Event Information Table) and a TOT (Time Offset Table).

The SDT includes information regarding a service name that corresponds to a broadcast channel, a service provider, and so on. The EIT includes information regarding an event name that corresponds to a program, the time at which the event starts, the duration time, and so on. The TOT includes information regarding the current date and time.

The video processing unit 207 performs a video adjustment process based on the video data that has been input from the video decoding unit 205 and the program information that has been input from the program information decoding unit 206, and outputs the adjusted video data to the display control unit 209.

The audio control unit 208 performs a D/A (Digital/Analog) conversion process on the audio data that has been input from the audio decoding unit 204, and outputs the resulting signal to an audio output unit 221.

The UI screen forming unit 220 forms an EPG (Electronic Program Guide) or the like based on the program information that has been input from the program information decoding unit 206, and outputs the EPG or the like to the display control unit 209.

The display control unit 209 performs switching or synthesis of the video data and screen data that have been input from the video processing unit 207 and the UI screen forming unit 220, respectively, in response to operation of the remote controller 250, and outputs the resulting data to a video display unit 222.

The video display unit 222 converts the video data and screen data that have been input from the display control unit 209 into display data suitable for the display resolution, the number of display colors and the refresh rate, and displays the resulting display data at an appropriate timing.

A system control unit 240 collectively controls the constituent elements.

A channel selection control unit 241 performs control of the data separation performed by the data separation unit 203 in accordance with the control of the system control unit 240.

A timer unit 243 measures the time, which is displayed on an OSD (On Screen Display) screen, or the like.

A communication control unit 247 performs control of the communication with the LAN 101.

Datacast Browsing Function of DTV 100

The datacast browsing function includes a function for displaying, on the video display unit 222, datacast data that is repeatedly output from a broadcast station in accordance with a data carousel format, and a function for outputting audio from the audio output unit 221.

The datacast data includes text information, display layout information, script information, still image information, audio information, and so on.

The text information is written in BML (Broadcast Markup Language), which is an XML (exetensible Markup Language)-based page description language for datacasting that is defined by the standards ARIB STD-B24, version 4.4, "Datacast Coding Scheme and Transmission Scheme for Digital Broadcasting" by the Association of Radio Industries and Businesses, Japan. The display layout information uses a CSS (cascading style sheet), and the script information uses ECMAScript.

The DOM (Document Object Model) is used to access the logical structure of BML information or the information itself, and to perform operations.

The internal operation of the DTV 100 when browsing a datacast will be described below.

The system control unit 240 determines that it has received a request to browse a datacast based on the operation information that was entered through the operation of the remote controller 250 by the user and was received through the light-receiving unit 251, and then requests a datacast control unit 244 to start a datacast browsing process.

The datacast control unit 244 obtains datacast data that has been stored in a memory unit 242. If data necessary for browsing is not stored in the memory unit 242, the datacast control unit 244 requests the data separation unit 203 to provide the datacast data.

The datacast control unit 244 transmits the obtained datacast data to a datacast browsing processing unit 245, and requests a browsing process.

Upon receiving BML data, a related image, and so on, the datacast browsing processing unit 245 executes a script function written in the Onload attribute of a <body> tag, as an initial script. This initial script invokes a function that enquires whether or not the DTV 100 has a print function, and determines whether or not to display a button image and text information regarding printing on the display.

After the execution of the initial script, the datacast browsing processing unit 245 displays the button image and text information via the UI screen forming unit 220 and the display control unit 209. Along with this operation, the display control unit 209 synthesizes the button image and text information with a moving image from the video processing unit 207.

With the operation of the UI, such as a print button that is displayed on the synthesized datacast screen, the user can input a print request to execute a print process to the DTV 100.

Datacast Print Function of DTV 100

The datacast browsing processing unit 245 waits for reception of any request from the user through the remote controller 250 while the datacast screen is being displayed. If a request is made by the user, the datacast browsing processing unit 245 determines the content of the request, and executes a process that corresponds to the request content.

For example, if the request is to move focus, a focus movement process is executed. If the request is to change the screen, a screen transition process is executed.

If the DTV 100 has a print function, the datacast browsing processing unit 245 provides a display indicating that it is possible to accept a print request from the user. If the datacast that is being displayed includes print information, a print button or the like, which allows the user to make a print request, is displayed. If the DTV 100 does not have a print function, ordinarily, a print button or the like is not displayed, even if the datacast that is being displayed includes print information.

If the datacast browsing processing unit 245 determines that a print request has been input from the user, it requests the print control unit 246 to execute a printFile process, a printTemplate process, a printStaticScreen process, a printUri process, and so on. For the print control between the DTV 100 and the printer 102 of the present embodiment, Print Enhanced, which is provided by UpnP, is used.

The datacast data includes, as print information, print content to be printed by the printer 102. Alternatively, the datacast data may include, as print information, an URI (Uniform Resource Identifier) that indicates the location of print content. In the case of the former, upon receiving an input of a print request from the user, the datacast browsing processing unit 245 requests the print control unit 246 to execute a printFile process. In the case of the latter, upon receiving an input of a print request from the user, the datacast browsing processing unit 245 requests the print control unit 246 to execute a printUri process.

As used herein, "print request" refers to a request to execute a print process based on print information included in a digital broadcast signal that is being received. Datacast data is associated with each channel of the digital broadcast signal being received, and the print request requests, for example, the execution of a print process based on print information included in the datacast data associated with a selected channel.

Print Information Existing Period Obtaining Function (Second Obtaining Unit) of DTV 100

The print control unit 246 has a function for obtaining the existing period of print information so as to suppress the occurrence of a situation where the print control unit 246 cannot obtain print information when the print control unit 246 instructs the printer 102 to execute a print process in accordance with a request of the datacast browsing processing unit 245. As used herein, "existing period of print information" means a time period during which print information is included in a digital broadcast signal that is received via the antenna 105.

Figure 3:
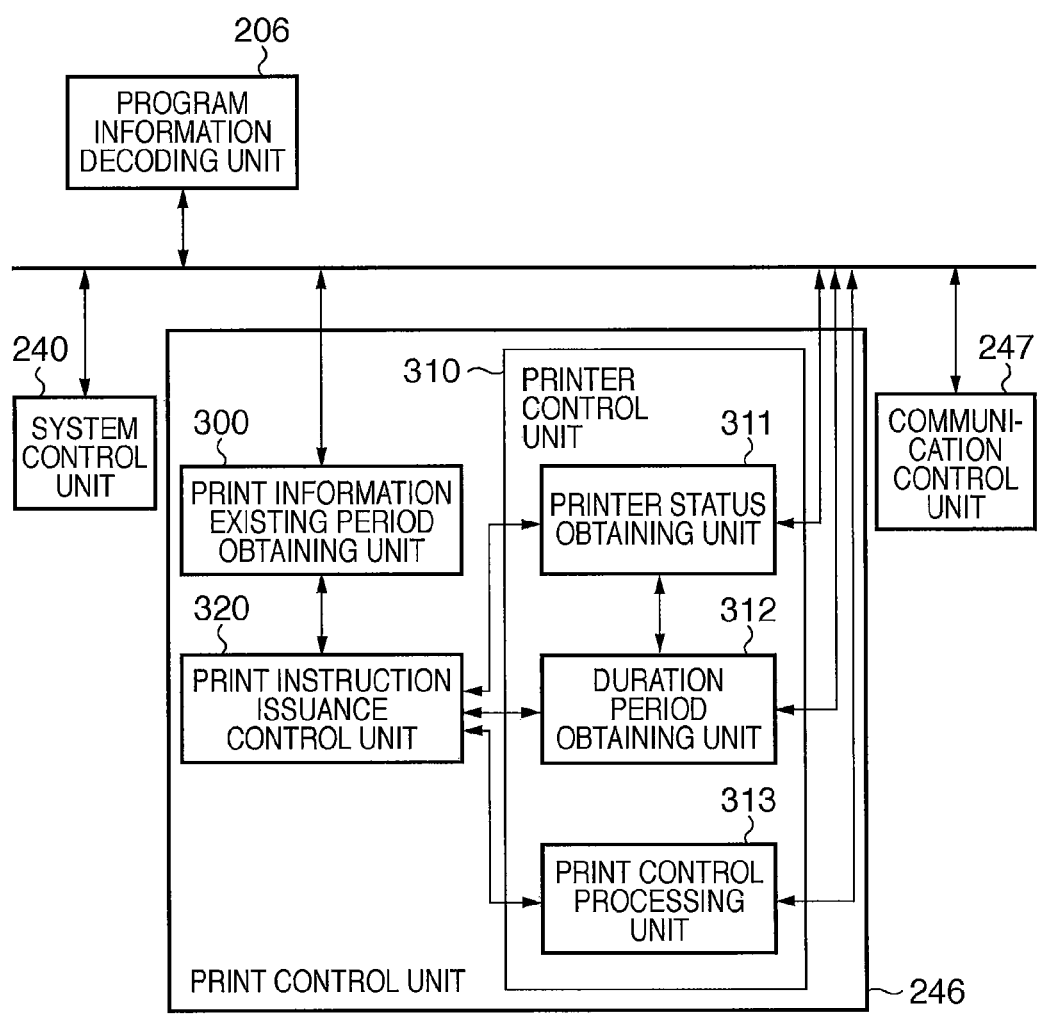
FIG. 3 is a block diagram illustrating the detailed configuration of a print control unit of the DTV according to the first embodiment.

FIG. 3 is a block diagram illustrating the detailed configuration of the print control unit 246. The print control unit 246 includes a print information existing period obtaining unit 300, a printer control unit 310, and a print instruction issuance control unit 320. The printer control unit 310 and the print instruction issuance control unit 320 will be described later with reference to FIGS. 4 to 7.

The print information existing period obtaining unit 300 obtains program information from the program information decoding unit 206 to obtain the time at which the program starts, which is written in the "start_time" data region of the EIT, from the obtained program information. The print information existing period obtaining unit 300 also obtains the duration time of the program which is written in the "duration" data region of the EIT. In the case where print information is transmitted together with program-related datacasting, usually, print information corresponding to a particular program is continuously transmitted with the digital broadcast signal while the program is being broadcast. Accordingly, the print information existing period obtaining unit 300 can interpret the airtime of a program, that is, the time period from "the time at which a program starts" to "the time at which the program starts+the duration time", as the existing period of the print information that is associated with that program.

With this interpretation, that the airtime of a program matches the existing period of the print information of the program, the print information existing period obtaining unit 300 can obtain the existing period of the print information by simply utilizing the standardized EIT.

Alternatively, by expanding part of the standard in a manner described below, the print information existing period obtaining unit 300 can obtain a more accurate existing period. Through this, it is possible to cope with the case where the airtime of a program and the existing period of the print information do not match. Here, a PSI (Program Specific Information)/SI (Service Information) table, and a descriptor are expanded.

A descriptor that contains print information (print information descriptor) will be described first. Print information existing period information is written in a print information descriptor. The print information existing period information includes the time at which a broadcast station starts transmitting print information and the duration time of the transmission.

The print information descriptor is disposed in either one or both of the PMT (Program Map Table) and the EIT.

When the print information descriptor is disposed in the PMT, it may be disposed in a PMT first loop (program loop) and a PMT second loop (ES (elementary stream) loop).

The print information descriptor that is inserted into the PMT first loop is disposed when specifying the existing period of print information with respect to the entire service.

The print information descriptor that is inserted into the PMT second loop is disposed when specifying the existing period of print information with respect to the corresponding ES. "Stream type" of the ES in which the print information descriptor is to be disposed is a data carousel (0x0D).

When the print information descriptor is disposed in the EIT, it may be disposed in an event loop of the EIT. The print information descriptor that is inserted into the event loop of the EIT is disposed when specifying a print information descriptor with respect to an event.

Upon receiving a print request from the user, the print information existing period obtaining unit 300 obtains SI data from the program information decoding unit 206. Then, the print information existing period obtaining unit 300 extracts the existing period of the print information from the obtained SI data. When the print information descriptor is disposed in both the PMT and the EIT, priority is given to the print information descriptor of the PMT.

Printer Status Obtaining Function of DTV 100

The print control unit 246 has a printer status obtaining function (printer status obtaining unit 311) so as to obtain the status of the printer 102 when the print control unit 246 instructs the printer to execute a print process in accordance with a request of the datacast browsing processing unit 245. The printer status obtaining function refers to a function for obtaining information (printer status) indicative of whether or not the printer 102 is currently executing a print process. The printer status obtaining function will be described below with reference to FIGS. 3 and 4.

In S400, the system control unit 240 detects that it has received a print request from the remote controller 250 via the light-receiving unit 251. Then, in S401, the printer status obtaining unit 311 transmits a printer status obtaining request to the printer 102 via the communication control unit 247 in accordance with the control of the system control unit 240.

In S402, upon receiving the printer status obtaining request, the printer 102 determines whether or not there currently is a print job in the printer 102. In S403, the printer 102 transmits the printer status according to the determination made in S402 to the DTV 100. Specifically, if there is a print job, the printer status indicates that the printer 102 is executing a print process. Conversely, if there is no print job, the printer status indicates that the printer 102 is not executing a print process.

Print Process Duration Period Obtaining Function (First Obtaining Unit) of DTV 100

The print control unit 246 has a print process duration period obtaining function. The print process duration period means a period during which a print process that is being executed by the printer 102 lasts. The print process duration period obtaining function will be described below with reference to FIGS. 3 and 5. In FIG. 5, the steps having the same reference numerals as those of FIG. 4 indicate the same processes as those of FIG. 4, so that descriptions thereof are omitted here.

In S500, the printer status obtaining unit 311 determines whether or not the printer 102 is executing a print process based on the printer status that was received in S403. If the printer 102 is executing a print process, in S501, the duration period obtaining unit 312 transmits a duration period obtaining request to the printer 102 via the communication control unit 247.

In S502, upon receiving the duration period obtaining request, the printer 102 calculates the period of duration of the print job being executed (the period from "the time at which a print job process starts" to "the time at which the print job process ends"). For the calculation process of the duration period, any algorithm can be used. For example, the printer 102 can calculate the duration period by multiplying the number of pages to be printed by the maximum value of the print time required per page. The duration period of the print job is not necessarily an exact value, and estimated time information is sufficient.

In S503, the printer 102 returns the duration period to the duration period obtaining unit 312. The duration period obtaining unit 312 obtains the duration time via the communication control unit 247.

In the foregoing description, the printer control unit 310 obtains the printer status and the duration period of the print process in a separate manner, but it is also possible to configure the printer control unit 310 and the printer 102 such that it is possible to obtain the printer status and the duration period of the print process collectively. For example, without the printer status obtaining process performed by the printer status obtaining unit 311, the duration period obtaining unit 312 transmits a duration period obtaining request to the printer 102. Upon receiving the duration period obtaining request, the printer 102 returns, to the printer control unit 310, a duration period calculated based on the print job held in the printer 102. If there is no print job in the printer 102, the printer 102 returns "0" as the duration period.

The format of the information, such as the existing period and the duration period, is not limited to those described here. What is important is that the print control unit 246 obtains information with which it is possible to determine which of the existing period of the print information and the duration period of the print process being executed by the printer 102 will end earlier. Accordingly, for example, the print information existing period obtaining unit 300 may obtain, instead of the existing period, the time at which the broadcast station will finish transmitting (broadcasting) the print information. Similarly, the duration period obtaining unit 312 may obtain, instead of the duration period, the time at which the printer 102 will finish the print process being executed. In either case, the print information existing period obtaining unit 300 obtains information regarding the existing period (second information), and the duration period obtaining unit 312 obtains information regarding the duration period (first information).

Pattern of Existing Period of Print Information and Duration Period of Print Process The relationship between the existing period of the print information (information existing period) and the duration period of the print process (job duration period) will be described with reference to FIG. 6. The pattern of the information existing period and the job duration period can be classified into the following seven patterns.

Pattern 1 represents the case where the time at which the job duration period ends is prior to the time at which the information existing period starts.

Pattern 2 represents the case where the time at which the job duration period starts is prior to the time at which the information existing period starts, the time at which the information existing period starts is prior to the time at which the job duration period ends, and the time at which the job duration period ends is prior to the time at which the information existing period ends.

Pattern 3 represents the case where the time at which the information existing period starts is prior to the time at which the job duration period starts, the time at which the job duration period starts is prior to the time at which the information existing period ends, and the time at which the job duration period ends is prior to the time at which the information existing period ends.

Pattern 4 represents the case where the time at which the information existing period starts is equal to the time at which the job duration period starts, and the time at which the information existing period ends is equal to the time at which the job duration period ends.

Pattern 5 represents the case where the time at which the job duration period starts is prior to the time at which the information existing period starts, the time at which the information existing period starts is prior to the time at which the job duration period ends, and the time at which the information existing period ends is prior to the time at which the job duration period ends.

Pattern 6 represents the case where the time at which the information existing period starts is prior to the time at which the job duration period starts, the time at which the job duration period starts is prior to the time at which the information existing period ends, and the time at which the information existing period ends is prior to the time at which the job duration period ends.

Pattern 7 represents the case where the time at which the information existing period ends is prior to the time at which the job duration period starts.

Overlapping Period Between Information Existing Period and Job Duration Period

The overlapping period between the information existing period and the job duration period will be described referring again to FIG. 6.

In Patterns 2 to 6 mentioned above, there is a period (overlapping period) during which the information existing period and the job duration period overlap with each other. If the DTV 100 issues a print instruction during the overlapping period, the printer 102 cannot accept the print instruction from the DTV 100 because there is a job being executed in the printer 102.

In FIG. 6, the overlapping period between the information existing period and the job duration period is indicated by a dashed rectangle.

User's Print Request Timing in Each Pattern Regarding Information Existing Period and Job Duration Period The user's print request timing in each pattern regarding the information existing period and the job duration period will be described referring again to FIG. 6.

In Patterns 1, 2, 3, 6 and 7 mentioned above, the information existing period includes a period during which the printer 102 has no print job being executed. During that period, a case may arise in which the DTV 100 receives a print request from the user (U1).

Likewise, in Patterns 4, 5 and 6, the print job being executed in the printer 102 is completed after the information existing period ends. During this overlapping period, a case may arise in which the DTV 100 receives a print request from the user (U2).

Likewise, in Patterns 2 and 3, the print job being executed in the printer 102 is completed midway in the information existing period. During this overlapping period, a case may arise in which the DTV 100 receives a print request from the user (U3).

Relationship Between Timing of Receiving Print Request and Timing of Issuing Print Instruction The relationship between the timing at which the DTV 100 receives a print request and the timing at which the DTV 100 issues a print instruction to the printer 102 will be described next with reference to FIGS. 6 and 7.

Figure 7:
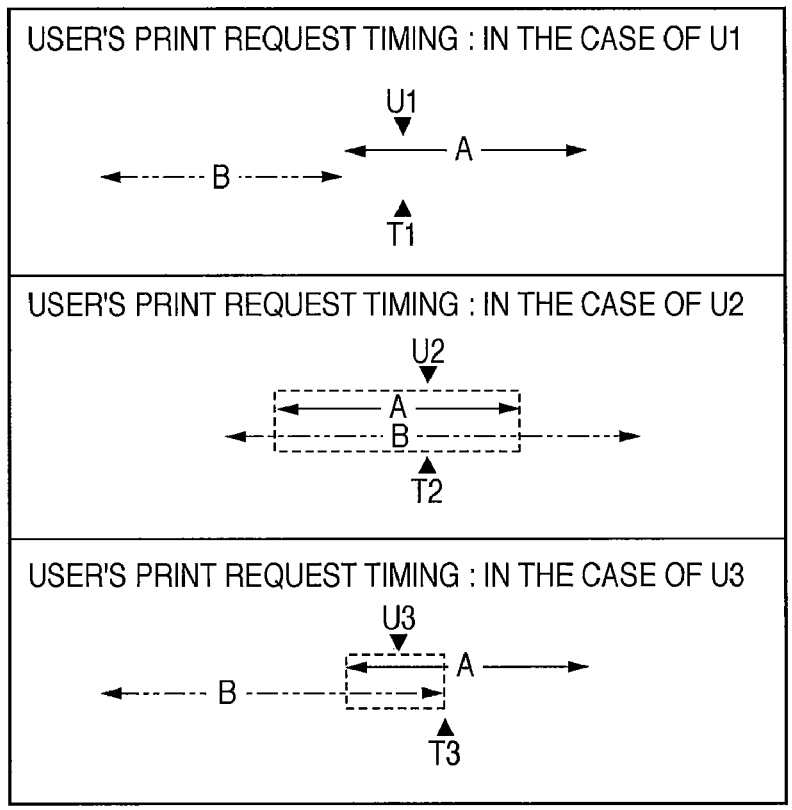
FIG. 7 is a diagram illustrating the relationship between the timing of receiving a print request and the timing of issuing a print instruction.

FIG. 7 is a diagram illustrating the timing at which the user enters a print request to the digital broadcast receiving apparatus and the timing at which the digital broadcast receiving apparatus issues a print instruction to the printer 102, where the present embodiment is applied.

The print instruction issuance control unit 320 provided in the DTV 100 obtains an existing period from the print information existing period obtaining unit 300. The print instruction issuance control unit 320 also obtains a duration period from the duration period obtaining unit 312. The print instruction issuance control unit 320 provided in the DTV 100 performs the following print instruction issuance control process for the respective patterns of FIG. 6.

In Pattern 1, the time at which the job duration period ends is prior to the time at which the information existing period starts, and thus the printer 102 is in the idle state at the time of receiving a print request from the user (U1) (FIG. 6). Accordingly, the DTV 100 immediately issues a print instruction to the printer 102 (T1) (FIG. 7).

In Pattern 2, the time at which the job duration period starts is prior to the time at which the information existing period starts, the time at which the information existing period starts is prior to the time at which the job duration period ends, and the time at which the job duration period ends is prior to the time at which the information existing period ends, and thus the following two cases can be considered for the timing of receiving a print request from the user (FIG. 6).

The first case is the case where the timing of receiving a print request from the user occurs during the overlapping period (U3). In this case, because the print information is present after the time at which the job duration period ends, the DTV 100 issues a print instruction to the printer 102 after the printer 102 finishes the print process being executed (T3) (FIG. 7).

The second case is the case where the timing of receiving a print request from the user occurs after the overlapping period (U1). In this case, the printer 102 is in the idle state. Accordingly, the DTV 100 immediately issues a print instruction to the printer 102 (T1) (FIG. 7).

In Pattern 3, the time at which the information existing period starts is prior to the time at which the job duration period starts, the time at which the job duration period starts is prior to the time at which the information existing period ends, and the time at which the job duration period ends is prior to the time at which the information existing period ends, and thus the following two cases can be considered for the timing of receiving a print request from the user (FIG. 6).

The first case is the case where the timing of receiving a print request from the user occurs before or after the overlapping period (U1). In this case, the printer 102 is in the idle state. Accordingly, the DTV 100 immediately issues a print instruction to the printer 102 (T1) (FIG. 7).

The second case is the case where the timing of receiving a print request from the user occurs during the overlapping period (U3). In this case, because the print information is present after the time at which the job duration period ends, the DTV 100 issues a print instruction to the printer 102 after the printer 102 finishes the print process being executed (T3) (FIG. 7).

In Pattern 4, the time at which the information existing period starts is equal to the time at which the job duration period starts, and the time at which the information existing period ends is equal to the time at which the job duration period ends, and thus the timing of receiving a print request from the user occurs during the overlapping period (U2). And no print information is present after the job duration period. Accordingly, the DTV 100 suspends the print process being executed by the printer 102, and issues a print instruction (T2) (FIG. 7).

In Pattern 5, the time at which the job duration period starts is prior to the time at which the information existing period starts, the time at which the information existing period starts is prior to the time at which the job duration period ends, and the time at which the information existing period ends is prior to the time at which the job duration period ends, and thus the timing of receiving a print request from the user occurs during the overlapping period (U2). Also, no print information is present after the job duration period. Accordingly, the DTV 100 suspends the print process being executed by the printer 102, and issues a print instruction (T2) (FIG. 7).

In Pattern 6, the time at which the information existing period starts is prior to the time at which the job duration period starts, the time at which the job duration period starts is prior to the time at which the information existing period ends, and the time at which the information existing period ends is prior to the time at which the job duration period ends, and thus the following two cases can be considered for the timing of receiving a print request from the user (FIG. 6).

The first case is the case where the timing of receiving a print request from the user occurs before the overlapping period (U1). In this case, the printer 102 is in the idle state. Accordingly, the DTV 100 immediately issues a print instruction to the printer 102 (T1) (FIG. 7).

The second case is the case where the timing of receiving a print request from the user occurs during the overlapping period (U2). And no print information is present after the job duration period. Accordingly, the DTV 100 suspends the print process being executed by the printer 102, and issues a print instruction (T2) (FIG. 7).

In Pattern 7, the time at which the information existing period ends is prior to the time at which the job duration period starts, and thus the printer 102 is in the idle state at the time of receiving a print request from the user (U1) (FIG. 6). Accordingly, the DTV 100 immediately issues a print instruction to the printer 102 (T1) (FIG. 7).

The foregoing descriptions include the phrase "the DTV 100 immediately issues a print instruction", but it is not necessarily "immediately" as long as the DTV 100 can issue a print instruction during the existing period of the print information after reception of the print request.

Flow of Print Process

The flow of a print process performed by the print system 10 will be described next with reference to FIG. 8.

If a request to print a datacast is generated by the user when selecting a datacast that includes print information, the DTV 100 starts the process of this flowchart.

In S801, the printer status obtaining unit 311 obtains a printer status that indicates whether or not the printer 102 is executing a print process.

In S802, the printer status obtaining unit 311 determines whether or not the printer 102 is executing a print process based on the printer status obtained in S801. If the printer 102 is executing a print process, the process advances to S803. If the printer 102 is not executing a print process, the process advances to S809, where the print instruction issuance control unit 320 issues a print instruction to instruct the printer 102 to execute a print process based on the print information.

In S803, the print information existing period obtaining unit 300 obtains the existing period of the print information.

In S804, the duration period obtaining unit 312 obtains the duration time of the print process.

In S805, the print instruction issuance control unit 320 determines whether or not the existing period will end earlier than the duration period. If it is determined that the existing period will end earlier than the duration period, the process advances to S806. Otherwise, the process advances to S808, where the print instruction issuance control unit 320 issues a print instruction after the duration period ends.

In S806, the print instruction issuance control unit 320 instructs the printer 102 to suspend the print process being executed. Subsequently, in S807, the print instruction issuance control unit 320 issues a print instruction.

According to the present embodiment, in some of the above-described cases, the print instruction issuance control unit 320 issues an instruction to suspend the print process being executed by the printer 102. This is executed by transmitting a command that can be interpreted by the printer 102 from the print instruction issuance control unit 320 to the printer 102. This command is a command that can suspend the print process being executed by the printer 102 and cause the printer 102 to enter a state in which the printer 102 can accept another print instruction. There is no limitation on the type of the command. It is preferable that the printer 102 is controlled such that the printer 102 suspends the print process being executed as soon as possible after receiving a command to suspend printing.

Variation: Java®-Based Application Execution Environment

The foregoing has been described in the context of datacasting using BML. The following discusses, as a variation, an embodiment that is suitable for a Java®-based application execution environment, such as MHP, GEM and OCAP, which are the broadcasting standards adopted in Europe, the United States, and other areas. Note that MHP is an abbreviation of "Multimedia Home Platform", and GEM is an abbreviation of "Globally Executable MHP". Likewise, OCAP is an abbreviation of "Open Cable Application Platform".

Figure 9:
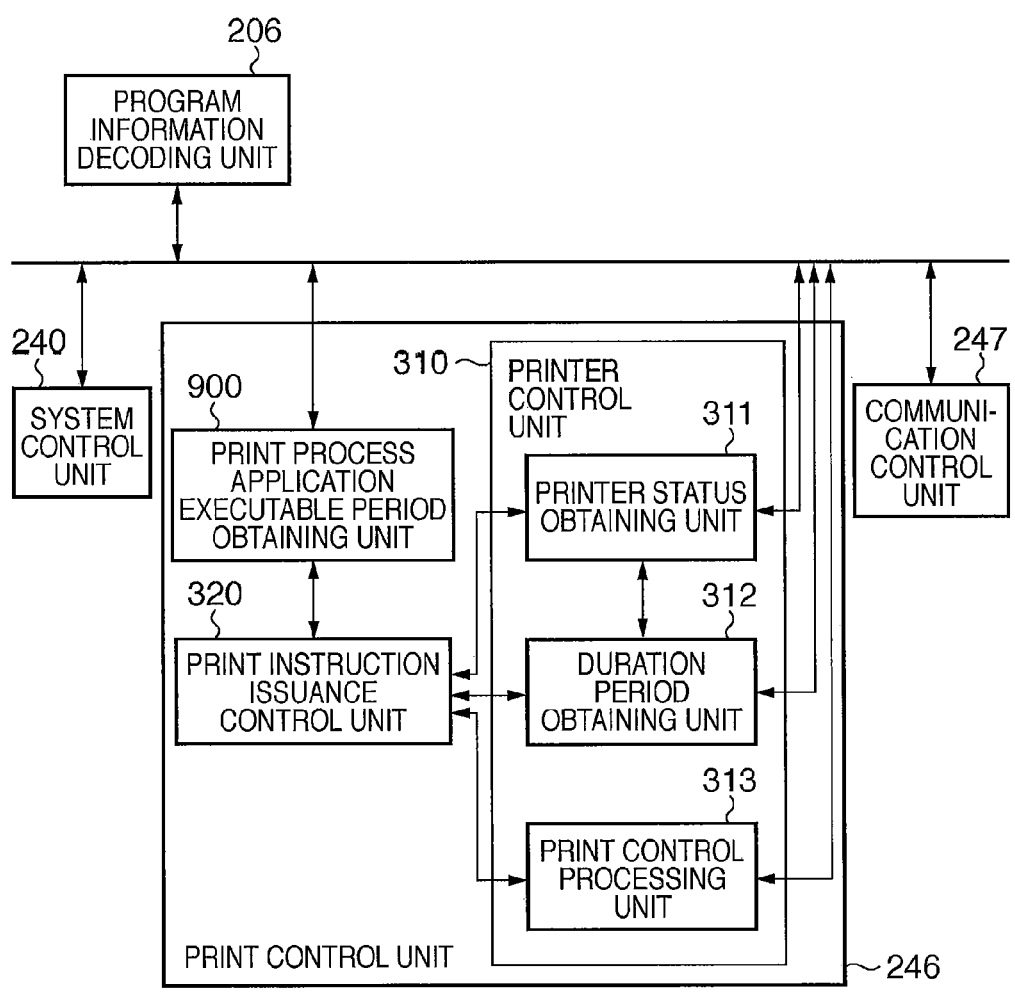
FIG. 9 is a diagram used to illustrate a variation of the first embodiment.
Figure 10:
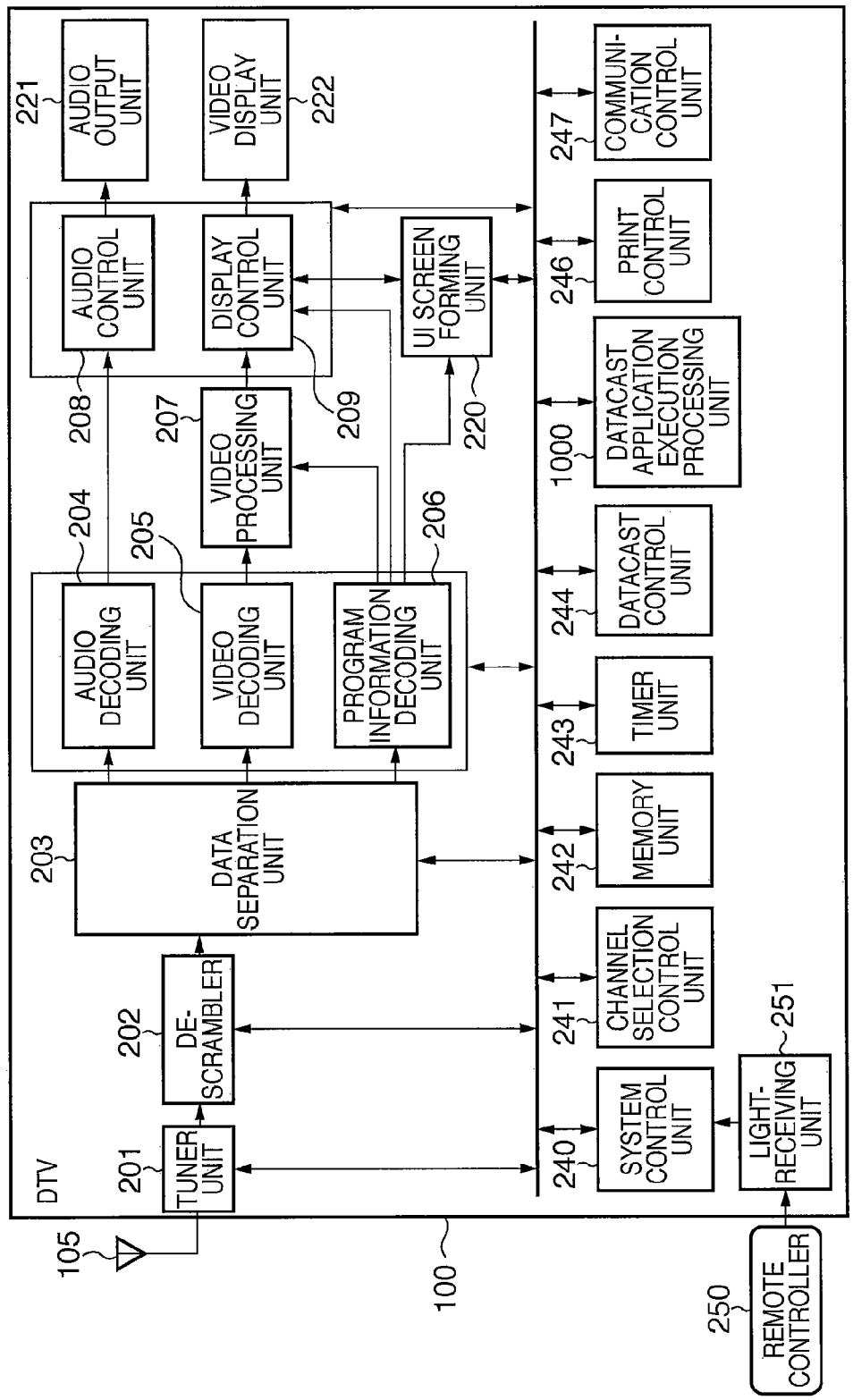
FIG. 10 is a diagram used to illustrate the variation of the first embodiment.

In this variation, the print information includes an application that can cause the print instruction issuance control unit 320 to issue a print instruction, and the period during which the application can be executed (application executable period) corresponds to the existing period of the print information. Accordingly, the print information existing period obtaining unit 300 of FIG. 3 is replaced by a print process application executable period obtaining unit 900 (see FIG. 9). Similarly, the datacast browsing processing unit 245 of FIG. 2 is replaced by a datacast application execution processing unit 1000 (see FIG. 10).

The print process application executable period obtaining unit 900 obtains table data from the program information decoding unit 206. Here, an AIT (Application Information Table) is obtained as an example of the table that includes an application executable period.

In the obtained AIT, for example, a control code, such as application_control_code, is written. With this control code, a broadcast station can let a receiver know how to process the application regarding life cycle.

Accordingly, the print process application executable period obtaining unit 900 calculates a print process application executable period by referring to the application_control_code.

Figure 8:
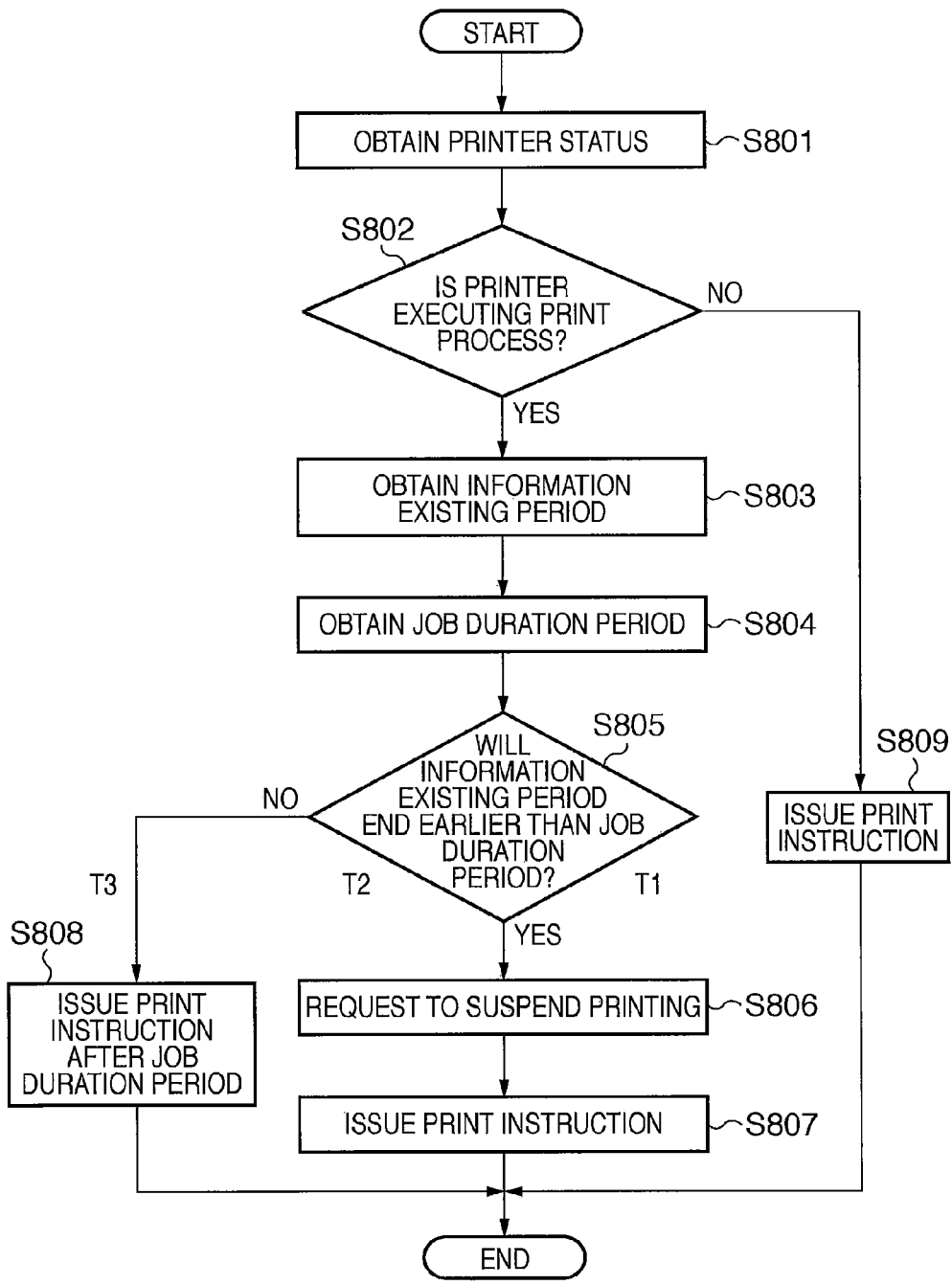
FIG. 8 is a flowchart illustrating the flow of a print process performed by a print system according to the first embodiment.

Similar to the case of BML, the calculated application executable period is applied to the process of FIG. 8 as an existing period.

Besides the obtaining of AIT, it is also possible to calculate the print process application executable period by expanding table data (e.g., PSI/SI data) that can be obtained by the DTV 100.

As described above, according to the present embodiment, when the printer 102 receives a print request while the printer 102 is executing a print process, the DTV 100 determines the timing at which the DTV 100 issues a print instruction to the printer 102 based on the existing period of the print information that corresponds to the print request and the duration period of the print process. For example, if the existing period ends earlier than the duration period, the DTV 100 suspends the print process being executed, and instructs the printer 102 to execute a print process based on the print information corresponding to the received print request.

Thereby, it is possible to reduce the possibility that the user of the digital broadcast receiving apparatus may fail to print desired print information that is included in broadcast signals.

Other Embodiments

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a Floppy® disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-221307, filed on Aug. 28, 2007, which is hereby incorporated by reference herein in its entirety.

What is claimed is:

1. A digital broadcast receiving apparatus for receiving a digital broadcast signal including print information, the apparatus being configured to communicate with a printing apparatus, the digital broadcast receiving apparatus comprising:

a reception unit operable to receive a print request for execution of a print process based on print information included in a digital broadcast signal that is being received;

a first obtaining unit configured to obtain first information regarding a period of duration of a print process that is being executed by the printing apparatus;

a second obtaining unit configured to obtain second information regarding an existing period during which print information that corresponds to the print request is included in the digital broadcast signal that is being received;

a determination unit operable to determine whether or not the existing period ends earlier than the period of duration, based on the first information and the second information; and a controller configured to control issuance of an instruction to suspend the print process that is being executed, based on a determination result by the determination unit, wherein the first information includes time at which the print process that is being executed ends, the second information includes time at which broadcasting of the print information corresponding to the print request ends, and the determination unit determines that the existing period ends earlier than the period of duration if the time at which broadcasting of the print information corresponding to the print request ends is before the time at which the print process that is being executed ends, wherein if it is determined by the determination unit that the existing period does not end earlier than the period of duration, the controller is configured to issue an instruction to the printing apparatus to execute a print process based on the print information corresponding to the print request after the print process that is being executed is completed.

2. The digital broadcast receiving apparatus according to claim 1, wherein if it is determined by the determination unit that the existing period ends earlier than the period of duration, the controller is configured to issue an instruction to the printing apparatus to suspend the print process that is being executed and execute a print process based on the print information corresponding to the print request.

3. The digital broadcast receiving apparatus according to claims 1, wherein the print information corresponding to the print request is associated with one channel included in the digital broadcast signal that is being received, and the second obtaining unit obtains the second information from the PSI (Program Specific Information)/SI (Service Information) of the one channel included in the digital broadcast signal that is being received.

4. The digital broadcast receiving apparatus according to claim 3, wherein the second obtaining unit is configured to obtain time at which a program of the one channel starts and duration time of the program as the second information from program information of the one channel included in the digital broadcast signal that is being received.

5. The digital broadcast receiving apparatus according to claim 1, wherein the print information corresponding to the print request is included in one channel of the digital broadcast signal that is being received, wherein the print information corresponding to the print request includes an application configured to enable the controller to perform the control, and the second obtaining unit is configured to obtain information regarding a period during which the application can be executed as the second information.

6. A method for controlling a digital broadcast receiving apparatus that receives a digital broadcast signal including print information, and that is connected to a printing apparatus so as to communicate therewith, the method comprising:

receiving a print request that requests execution of a print process based on print information included in a digital broadcast signal that is being received;

obtaining first information regarding a period of duration of a print process that is being executed by the printing apparatus;

obtaining second information regarding an existing period during which print information that corresponds to the print request is included in the digital broadcast signal that is being received;

determining whether or not the existing period ends earlier than the period of duration based on the first information and the second information controlling issuance of an instruction to suspend the print process that is being executed based on a determination result of the determination step, wherein the first information includes time at which the print process that is being executed ends, and the second information includes time at which broadcasting of the print information corresponding to the print request ends; and wherein it is determined that the existing period ends earlier than the period of duration if the time at which broadcasting of the print information corresponding to the print request ends is before the time at which the print process that is being executed ends, wherein if it is determined that the existing period does not end earlier than the period of duration, controlling issuance of an instruction to the printing apparatus to execute a print process based on the print information corresponding to the print request after the print process that is being executed is completed.

7. A non-transitory machine readable storage medium storing a computer program which, when loaded into a digital broadcast receiving apparatus and executed, performs a method comprising:

receiving a print request that requests execution of a print process based on print information included in a digital broadcast signal that is being received;

obtaining first information regarding a period of duration of a print process that is being executed by printing apparatus in communication with the digital broadcast receiving apparatus;

obtaining second information regarding an existing period during which print information that corresponds to the print request is included in the digital broadcast signal that is being received;

determining whether or not the existing period ends earlier than the period of duration based on the first information and the second information; and controlling issuance of an instruction to suspend the print process that is being executed based on a determination result of the determination step, wherein the first information includes time at which the print process that is being executed ends, and the second information includes time at which broadcasting of the print information corresponding to the print request ends; and wherein it is determined that the existing period ends earlier than the period of duration if the time at which broadcasting of the print information corresponding to the print request ends is before the time at which the print process that is being executed ends, wherein if it is determined that the existing period does not end earlier than the period of duration, controlling issuance of an instruction to the printing apparatus to execute a print process based on the print information corresponding to the print request after the print process that is being executed is completed.

* * * * *